Figure 1:
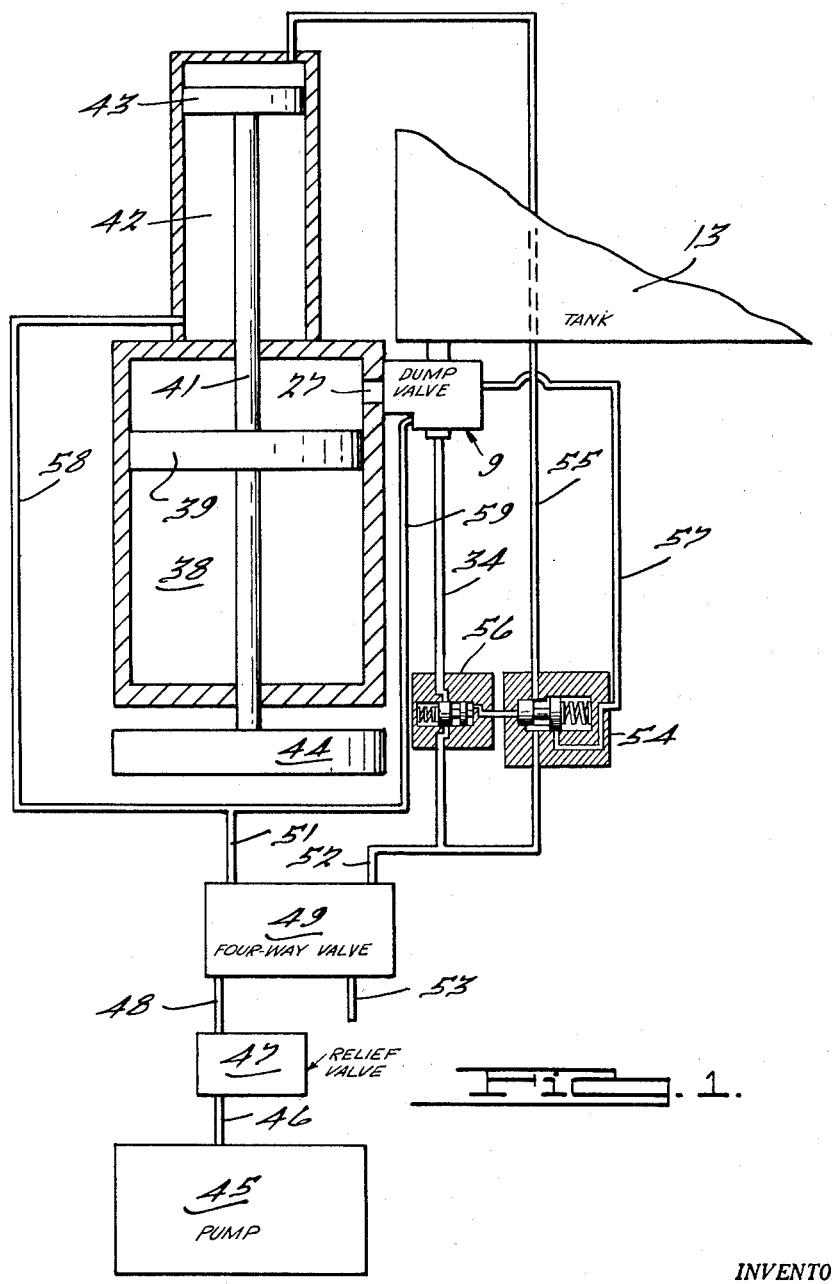

Sept. 29, 1964    B. J. MOLLOY    3,150,857
FLUID DUMP VALVE

Filed Sept. 15, 1960    2 Sheets-Sheet 1

INVENTOR.
Brian J. Molloy.
BY
Harness, Dickey & Pierce
ATTORNEYS 3,150,857
FLUID DUMP VALVE
Brian J. Molloy, Grosse Pointe, Mich., assignor to Molloy Manufacturing Company, Detroit, Mich., a corporation of Michigan
Filed Sept. 15, 1960, Ser. No. 56,297
2 Claims. (Cl. 251—63)

This invention relates to dump valves, and particularly to a valve through which a large volume of fluid may pass in a very short time.

The valve has particular application during the advancement of compound pistons and a work-performing element into engagement with the work until a predetermined pressure builds up. During this advancement and the delivery of fluid to the smaller of two pistons, the area above the larger piston must be filled with fluid to eliminate back pressure and to have the cylinder filled when pressure is applied thereto to assist the smaller piston during the work-performing cycle. The back pressure which builds up on the small piston when the work is engaged operates a sequence valve which directs fluid to a piston which closes the dump valve and directs fluid through the dump valve behind the larger piston which, when pressurized, substantially increases the force applied by the small piston to perform the work operation. Upon the completion of the work operation, a four-way valve is actuated to deliver fluid below the smaller piston and to direct fluid thereabove to tank. The dump valve is operated to open the passage to tank after the pressure on the fluid has been reduced by bleeding off a small quantity of the fluid from the pressure side of the larger piston through a metering orifice by the opening of a ball check valve. The opening of the passageway to tank permits the large amount of fluid accumulated above the large piston to pass through the dump valve back into tank during the return stroke of the smaller piston thereabove. At the end of the return stroke of the smaller piston, the system is shut off with the dump valve open, leaving the area above the larger piston in communication with the fluid in the tank in preparation for the next operation of the system.

Accordingly, the main objects of the invention are: to provide a valve having a large intake and outlet port closed by a valve for cutting off the flow of fluid from a tank so that the delivered fluid can be pressurized; to provide a valve body with a movable valve containing a piston and a metering orifice containing a check valve which is seated by a spring and sealed by the pressure of the fluid which advances the valve to seated position; to provide a valve with a metering orifice which bleeds off the pressure on one side thereof when the fluid back of the piston maintaining the valve in seated position is returned to tank, and, in general, to provide a dump valve which produces the flow of a large quantity of fluid by gravity that is simple in construction, positive in operation and economical of manufacture.

Figure 2:
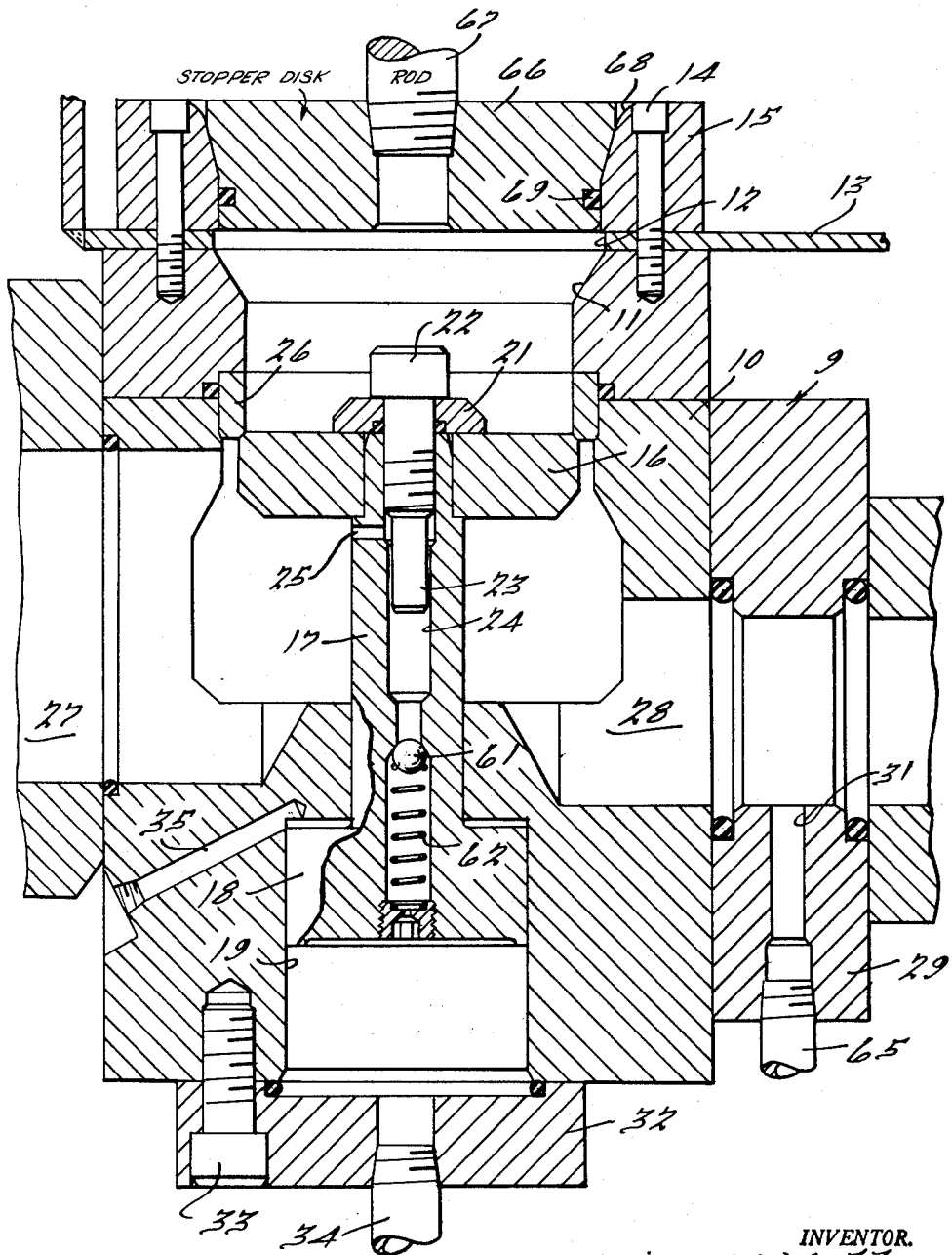

Other objects and features of novelty of the invention will be specifically pointed out or will become apparent, when referring, for a better understanding of the invention, to the following description taken in conjunction with the accompanying drawings, wherein:

FIGURE 1 is a schematic view of a pair of connected pistons in adjoining cylinders to one of which fluid is delivered through a dump valve, which embodies features of the present invention, and FIG. 2 is an enlarged sectional view of the dump valve illustrated in FIG. 1.

The dump valve 9 of the present invention comprises a body 10 which has a large intake opening 11 communicating through an opening 12 in the bottom of a tank 13 when the body is secured thereto by screws 14 extending through a supporting ring 15. A valve 16 is mounted on a stem 17 projecting from a piston 18 within a cylinder 19. The stem 17 is retained in position by a washer 21 and a screw 22. The end portion 23 of the screw has a slight clearance with the wall of an aperture 24 within the stem 17 and forms a metering orifice for the fluid from a passageway 25 beneath the valve 16. The valve seats upon a ring 26 and prevents fluid within the tank 13 from passing beyond the valve. An outlet orifice 27 and an inlet or intake orifice 28 are provided in the body opposite to each other below the valve 16. A plate 29 forming a portion of the inlet orifice has a passage 31 leading therefrom in communication with the fluid within the orifice 28. A plate 32 secured by a plurality of screws 33 to the end of the body closes the cylinder 19 and communicates therewith through a conduit 34. A passageway 35 in the body communicates with the cylinder 19 on the top side of the piston 18 for moving the piston and valve 16 downwardly. A rapid flow of fluid from the tank 13 occurs outwardly through the orifice 27 when the valve 16 is unseated.

Referring to FIG. 1, a large cylinder 38 contains a piston 39 on a piston rod 41 which extends into a cylinder 42 and is joined to a piston 43 therein. The piston rod 41 extends below the cylinder 38 and is connected to a work supporting head 44 for the purpose of performing work exteriorly of the cylinders. A fluid supply under pressure is provided by a pump 45 which directs fluid through a conduit 46 to a relief valve 47 from which fluid flows through a conduit 48 to a four-way valve 49. The four-way valve has outlets 51 and 52 and a conduit 53 which directs the fluid to tank. When the four-way valve 49 is moved to direct fluid under pressure through the conduit 52, it will flow to a sequence valve 54 from which it will pass through a conduit 55 to the top of the cylinder 42 to apply pressure to the upper side of the piston 43 to move the piston downwardly. The valve 16 of the dump valve 9 will move to open position as the conduit 34 is now connected to tank through the four-way valve 49 and the fluid in tank 13 will pass through the valve body and the orifice 27 to the cylinder 38 above the piston 39 thereof. The fluid thus flowing into the cylinder 38 is by gravity and provides no pressure other than the weight of the fluid for urging the piston 39 downwardly. The operation will continue until the work head 44 engages the work and applies a pressure thereto by the force behind the piston 43. Pressure will build up in the fluid in conduit 55 when a load builds up on the piston 43 which will sequence the valve 54 and admit fluid to operate the valve 56 which will supply fluid to the conduit 34 and to the cylinder 19 of the dump valve 9. The piston 18 in the cylinder 19 will be advanced to move the valve 16 into engagement with its seat on the ring 26 to thereby cut off the orifice 27 from the passageway 11, as disclosed in FIG. 2. Fluid is also admitted from the sequence valve 54 to a conduit 57 and to the orifice 28 of the dump valve 9. The fluid will pass through the body 10 and the orifice 27 to apply pressure above the piston 39 in the cylinder 38. The fluid pressure on both of the pistons 39 and 43 quickly completes the work-performing operation by the work head 44.

When the work operation is performed, the four-way valve 49 is operated to connect the conduits 55 and 52 to the conduit 53 to tank while supplying fluid pressure through the conduit 51 to a conduit 58 from which it is conducted to the bottom of the cylinder 42. Fluid is also passed through a conduit 59 to the passageway 35 in the valve body above the piston 18 to urge the piston toward the end of the cylinder 19 having the conduit 34 in communication therewith which is now connected to tank. The fluid under pressure in the body of the valve below the valve 16 will flow through the passageway 25 past the metering area about the end 23 of the screw 22 to unseat a ball 61 from its seat where it has been maintained by a spring 62 and the fluid below the piston 18. The unseating of the ball bleeds off the high pressure of the trapped fluid in the cylinder 38 above the piston 39 and permits the fluid in the passageway 35 to rapidly move the piston 18 downwardly to move the valve 16 to open position. The fluid pressure below the piston 43 moves the piston 39 upwardly therewith and causes the fluid above the piston 39 to flow through the orifice 27 and the valve body and out the orifice 11 into the tank 13. The cylinder may be repeated by reversing the four-way valve 49 to repeat the sequence of operation above indicated. A conduit 65 may be joined to the orifice 28 in the valve body to be employed for operating the four-way valve 49 when the pressure has risen to a predetermined amount at the completion of the work operation, or a proximity type of switch or other device may be utilized for signaling the completion of the work operation.

The valve thus provided permits the flow of a large quantity of fluid to fill the cylinder above the piston to reduce the time for supplying the large quantity of oil thereto as well as the required heavy pumping equipment. When the valve is unseated, the oil directly flows by gravity into the area above the piston as the piston is moved toward a work-performing position. Thereafter, the valve is closed to permit fluid pressure to be applied to the fluid above the piston to produce a substantial amount of work by the pumping of a small quantity of fluid. After the work operation has been performed, the opening of the valve and the movement of the piston to its initial position will cause the oil above the piston to pass through the valve body back into the tank ready for a second operation.

By the use of a metered passageway below the valve, the high pressure fluid trapped above the piston has the pressure quickly reduced so that the supply of fluid above the piston for opening the valve may immediately function to produce its operation. By employing the ring 15 on the inside of the tank aligned with the orifice 11, a stopper disk 66 may be inserted by a rod 67 into the aperture 68 in the ring 15 where it is sealed by an O-ring 69 to cut off the fluid from the tank in case repairs or reconstruction is to take place on the valve or parts of the cylinder without the necessity of draining the tank.

What is claimed is:

1. In a valve, a body having a chamber connecting a large inlet opening, a large outlet opening and an opening for pressure fluid which is to be supplied to the outlet opening when a passageway to the large inlet opening is closed, a valve for closing said large inlet opening, a piston in a cylinder in the body having an extending stem secured to said valve, means for delivering fluid to and from the ends of the piston, said piston and stem having a passage therethrough, a spring-pressed check valve disposed in said passage moved to sealing position when fluid is delivered to the cylinder on the side of the piston opposite to that having the stem, and a metering orifice in the hollow of said stem which controls the flow of fluid therethrough for reducing the pressure on the fluid in the chamber when the first said valve is closed to permit the piston to move the valve to open position when fluid is delivered to the cylinder on the stem side of the piston.

2. In a valve, a body having a chamber connecting a large inlet opening, a large outlet opening and an opening for pressure fluid which is to be supplied to the outlet opening when a passageway to the large inlet opening is closed, a valve for closing said large inlet opening, a piston in a cylinder in the body having an extending stem secured to said valve, means for delivering fluid to and from the ends of the piston, said piston and stem having a passage therethrough, a check valve disposed in said passage moved to sealing position when fluid is delivered to the cylinder on the side of the piston opposite that having the stem, said passageway controlling the rate of flow of fluid therethrough for reducing the pressure on the fluid in the chamber when the valve is closed to permit the piston to move the valve to open position.

References Cited in the file of this patent
UNITED STATES PATENTS

| | | |
|---|---|---|
| 896,402 | Locke | Aug. 18, 1908 |
| 1,700,363 | Barrett et al. | Jan. 29, 1929 |
| 1,895,710 | Ernst et al. | Jan. 31, 1933 |
| 2,301,028 | Esch | Nov. 3, 1942 |
| 2,609,832 | Smith | Sept. 9, 1952 |
| 2,870,781 | Tennis | Jan. 27, 1959 |

FOREIGN PATENTS

| | | |
|---|---|---|
| 87 | Great Britain | Jan. 10, 1863 |
| 806,135 | France | Sept. 14, 1936 |
| 807,073 | France | Oct. 5, 1936 |